Patented May 23, 1933

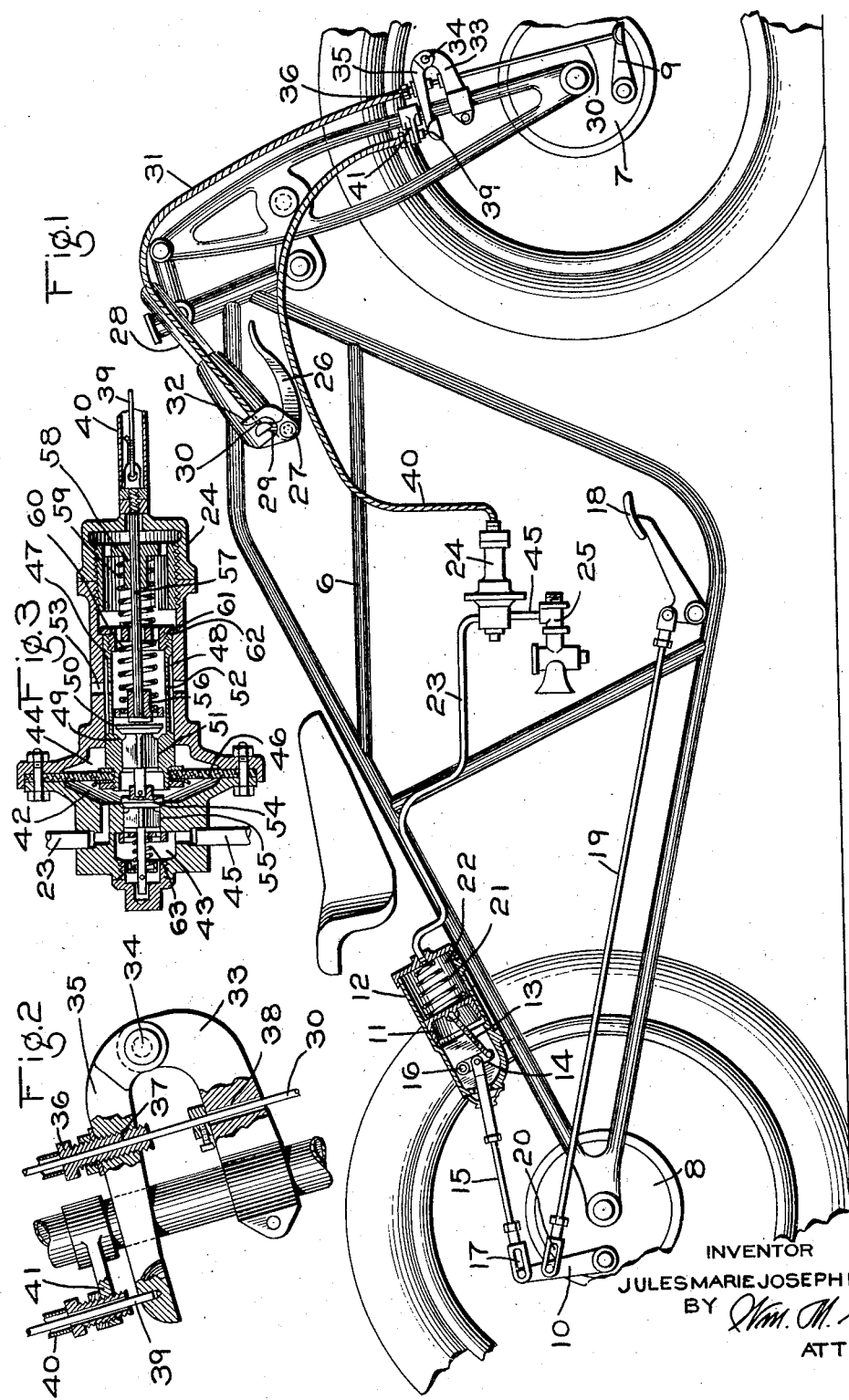

1,910,527

UNITED STATES PATENT OFFICE

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE

Application filed July 24, 1930, Serial No. 470,290, and in Great Britain October 29, 1929.

This invention relates to brakes and more particularly to improvements in brake mechanisms for automotive vehicles.

An object of the invention is to provide an improved brake mechanism for effecting by means of a single control member, the operation of two braking elements or the actuation of one or more braking elements from two sources of power in such a manner that the braking effort exerted upon the two elements or by the two sources of power will be distributed and equalized.

Another object of the invention is to provide an improved brake mechanism of the above type wherein the reaction of the force required to effect the operation of one of the braking elements is utilized for effecting the operation of another braking element.

Another object of the invention is to provide an improved brake mechanism of the character mentioned which is simple in construction, and reliable and exact in function under all conditions of service.

The invention is more particularly applicable to servo brake mechanisms in which the braking action is partly due to the mechanical effort exerted upon the controlling member by the operator of the vehicle and partly to the effort exerted by a servo mechanism operated from the induction pipe of the engine or other source of vacuum or pressure, the action of the servo mechanism being controlled by a valve device which in turn is controlled by the controlling member.

According to the principal feature of the invention, the controlling member is arranged to be connected to one end of a Bowden wire transmission, the resulting movement of both the wire and the sheath at the other end of the transmission being utilized to effect the operation of the two braking elements or to control the application of the braking effort from two sources.

The invention also comprises certain new and useful improvements in the construction, arrangement and combination of the several parts of which it is composed, as will be hereinafter more fully described and claimed.

In the accompanying drawing; Figure 1 is a side elevation of the brake equipment of a motor cycle embodying one form of the invention; Fig. 2 is an enlarged detail view partly in section, of a portion of the equipment shown in Fig. 1; and Fig. 3 is a section of the control valve device.

Referring to the drawing, the front and rear wheels of a motor cycle 6 are each provided with brakes, the front wheel brake 7 being adapted to be mechanically operated and the rear wheel brake 8 being adapted to be operated by pneumatically actuated means. For sake of clearness, the brakes 7 and 8 are conventionally shown, the front wheel brake being operated by means of a lever 9, and the rear wheel brake being operated by a lever 10.

The pneumatically actuated means for operating the rear wheel brake 8 may comprise a small piston 11 contained in a cylinder 12 mounted on the rear portion of the motor cycle frame.

The piston 11 is connected to the rear wheel brake lever 10 by means of a flexible member or chain 13, lever 14, and link 15. The lever 14 is pivotally mounted on a pin 16 carried by the casing of the cylinder 12. The chain 13 is secured to the free end of the lever 14, and the inner end of the link 15 is pivoted to the intermediate portion of the lever 14. The opposite, or outer end of the link 15 which is connected to the brake lever 10, is slotted as at 17 so as to permit of the rear wheel brake being mechanically actuated by a pedal 18 if desired. As shown, the pedal 18 is connected to the brake lever 10 by a rod 19 having a slot 20 formed therein at its outer end.

The piston 11 is subject on one side to the pressure of an expansible coil spring 21 contained in chamber 22.

When the brakes are to be applied, the chamber 22 is adapted to be placed in communication through a pipe 23 and control valve device 24, with the induction pipe or intake manifold 25 of the motor cycle engine (not shown), thereby causing a partial vacuum to be established in the brake cylinder chamber 22 in the well known manner.

Both the front and rear wheel brakes are adapted to be controlled by a single brake handle 26 in the form of a curved lever pivotally mounted at 27 on the end of one of the handle bars 28 of the motor cycle. The longer arm of the lever 26 extends for a short distance above the handle bar 28 towards the steering column, so as to be conveniently gripped by the operator. The shorter arm 29 of the brake handle lever is adapted to engage with a collar formed on the end of the wire 30 of a Bowden wire transmission, the sheath 31 at this end of the transmission being rigidly secured to the handle bar 28 by means of a bracket 32.

The Bowden wire transmission extends along the handle bar 28 to the steering column and thence downwardly along the front fork of the motor cycle.

Secured to the front fork is an arm 33 to which is pivotally connected at 34, a lever 35, which extends toward the rear of the motor cycle.

The sheath 31 of the Bowden wire transmission is secured, by means of a suitable coupling 36, to an intermediate point in the lever 35. The wire 30 of the transmission passes through an opening 37 in the lever 35 and through a corresponding aligned opening 38 in the arm 33 (see Fig. 2), the end of the wire being secured to the lever 9 of the front wheel brake.

Secured to the outer end of the lever 35 is one end of a wire 39 of another Bowden wire transmission leading to the control valve 24 for the rear wheel brake. The sheath 40 of this transmission is secured to a clamp or bracket 41 carried by the front fork of the motor cycle adjacent to the lever 35.

The control valve device 24 may comprise a casing provided with a plurality of chambers 42, 43 and 44, chamber 42 being connected to the piston chamber 22 heretofore referred to, by pipe 23, and chamber 43 being connected to the intake manifold 25 of the motor cycle engine by pipe 45. Chambers 42 and 44 are separated by a flexible diaphragm 46.

Carried by the diaphragm 46 is a cylindrical cage 47 which passes through the chamber 44 and is mounted for longitudinal movement in a cylinder 48 formed in the casing as an extension of the chamber 44.

At the diaphragm end, the cage 47 is provided with a valve seat 49, for a valve 50 mounted in the cage. The valve 50 has a fluted stem extending through an opening 51 formed centrally of the cage and of the diaphragm. The purpose of the valve 50 is to control communication from chamber 42, through the cage 47 and cylinder 48, to the atmosphere, the cage being perforated as at 52, and the cylinder 48 being perforated as at 53.

Secured to the stem of the valve 50 is a valve 54 for controlling communication through an opening 55 formed in the wall of the casing separating chambers 42 and 43.

Mounted in the casing and having one end connected to the wire 39 and sheath 40 of the second Bowden wire transmission and its other end provided with a collar 56, is a rod 57 which is guided by a bushing 58 mounted in the casing in spaced relation to the cage 47.

Interposed between the end of the cage 47 and the bushing 58, is an expansible coil spring 59, and interposed between the collar 56 and the end of the cage is a coil spring 60.

The outer end of the cage 47 is provided with a perforated cap 61 through which the rod 57 extends. This cap is provided with a flange adapted to engage a shoulder 62 formed in the wall of the cylinder 48 so as to limit the inward movement of the cage and diaphragm.

In the release position of the control valve device 24, valve 54 is held seated by its spring 63, and the diaphragm 46 and cage 47 are held in the position shown with the flange of the cap 61 bearing against the shoulder 62, by spring 59. With the valve 54 seated, communication will be cut off between chambers 42 and 43.

In release position, valve 50 is unseated, so that piston chamber 22 is connected to the atmosphere, through pipe 23, chamber 42, opening 41, the interior of the cage 47, and openings 52 and 53.

When it is desired to apply the brakes, the operator grips the handle 26 and moves the same towards the handle bar 28. This action causes the wire 30 of the Bowden wire transmission to be withdrawn from the sheath 31, the corresponding upward movement of this wire at the opposite end of the transmission causing the front wheel brake 7 to be applied through the lever 9.

The sheath 31 is subjected to stress, when the wire 30 is pulled from the sheath, due to the tendency of the wire to straighten out, and this stress reacts, with the upper end of the sheath held by the bracket 32, to press the lower end of the sheath against the lever 35, so as to cause a downward thrust to be exerted on said lever, with the result that the wire 39 of the second Bowden wire transmission is placed under tension, so that the collar 56 on the inner end of the rod 57 is drawn outwardly of the cage 47. This action compresses the spring 60 and the pressure of the spring 60 on the cap 61 moves the cage 47 and diaphragm 46 outwardly, against the pressure of spring 59, until the valve 50 is seated against the seat 49.

With valve 50 thus seated, communication from the piston chamber 22 to the atmosphere will be cut off, and in continued outward movement of the cage 47, the valve 50 is carried with the cage. Since valve 54 is connected to valve 50, valve 54 will be withdrawn from its seat, thereby establishing the communication through which the piston chamber 22 is connected to the intake manifold 25 of the motor cycle engine, through pipe 23, chamber 42, opening 55, chamber 43, and pipe 45. With the chamber 22 thus connected to the source of vacuum, the piston 11 is moved toward the right by atmospheric pressure and through the chain 13 operates the lever 14, also to the right. The movement of the lever 14 is transmitted through the link 15 to the rear wheel brake lever 10, and the rear wheel brake 8 is thus applied.

It will be evident that the effort exerted by the operator upon the handle 26 is transmitted directly through the Bowden wire 30 to the front wheel brake 7 and by reaction through the sheath 31 of the Bowden wire transmission to the valve device 24, so that the mechanical application of the front wheel brake and the pneumatic application of the rear wheel brake are simultaneously effected and being dependent upon the action and reaction between the two parts of the Bowden wire transmission, the actuation of the valve device 24 and of the front wheel brake 7 are equalized as will be readily understood.

When the degree of vacuum in chamber 42, acting on the face of the diaphragm 46, becomes slightly greater than the pull of the wire 39, the diaphragm 46 will be deflected towards the left, thereby seating the valve 54 and closing the communication from the source of vacuum to the piston chamber 22. In this way the braking power effective on the rear wheel brake will be limited in proportion to the force transmitted through the wire 39.

Since the degree of vacuum obtained in piston chamber 22 is proportional to the pull on the wire 39, it will be apparent that if so desired, the pull on the wire can be increased in steps so as to cause the valve device 24 to operate to gradually increase the degree of vacuum in piston chamber 22, thereby effecting the gradual application of the rear wheel brake 8.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake apparatus of the type described comprising two braking elements, each having an operating lever, pneumatically actuated means connected to the lever of one of said braking elements for operating the same, valve means for controlling said pneumatically actuated means, a single control member, a Bowden wire transmission including a wire and a sheath, one end of the wire of said transmission being connected to the control member and the other end of said wire being connected to the other brake element operating lever, and means connecting the sheath of said Bowden wire transmission and said control valve means for operating said valve means.

2. An automotive vehicle brake device comprising a mechanically operated brake, a servo brake, valve means for controlling the servo brake, a Bowden wire transmission including a sheath and a wire, a manually operated member connected to one end of the Bowden wire transmission, said wire at its other end being connected to the mechanically operated brake, and means connected to said Bowden wire transmission and operated by the reactionary force of said sheath for operating said control valve means.

3. A brake apparatus comprising two brake controlling elements, a wire movable to operate one of said elements, means for moving said wire, a flexible sheath for said wire operatively connected to the other of said brake controlling elements, the wire and its sheath being arranged on a curve, so that upon stressing the wire to operate one of the brake controlling elements, the sheath will be moved to operate the other brake controlling element.

In testimony whereof I have hereunto set my hand and seal, at Paris, France, this 5th day of July 1930.

JULES MARIE JOSEPH DORMOY. [L. S.]